US005494312A

United States Patent [19]
Rink

[11] Patent Number: 5,494,312
[45] Date of Patent: Feb. 27, 1996

[54] AUTOIGNITION OF A FLUID FUELED INFLATOR

[75] Inventor: Karl K. Rink, Liberty, Utah

[73] Assignee: Morton International, Inc., Chicago, Ill.

[21] Appl. No.: 382,559

[22] Filed: Feb. 2, 1995

Related U.S. Application Data

[63] Continuation-in-part of Ser. No. 339,603, Nov. 15, 1994, and a continuation-in-part of Ser. No. 252,036, May 31, 1994, Pat. No. 5,470,104.

[51] Int. Cl.⁶ .................................................. B60R 21/26
[52] U.S. Cl. ..................... 280/737; 280/741; 222/3
[58] Field of Search ........................ 280/737, 741, 280/740, 736, 742; 222/3, 5

[56] References Cited

U.S. PATENT DOCUMENTS

| | | | |
|---|---|---|---|
| 3,817,263 | 6/1974 | Bendler et al. | 137/68.1 |
| 3,822,895 | 7/1974 | Ochiai | 280/737 |
| 3,901,530 | 8/1975 | Radke | 280/741 |
| 4,104,092 | 8/1978 | Mullay | 149/2 |
| 4,246,051 | 1/1981 | Garner et al. | 149/7 |
| 4,341,651 | 7/1982 | Beckert et al. | 149/87 |
| 4,561,675 | 12/1985 | Adams et al. | 280/741 |
| 5,060,973 | 10/1991 | Giovanetti | 280/736 |
| 5,263,740 | 11/1993 | Frey et al. | 280/737 |
| 5,290,060 | 3/1994 | Smith | 280/737 |
| 5,301,979 | 4/1994 | Allard | 280/741 |
| 5,330,730 | 7/1994 | Brede et al. | 422/305 |
| 5,344,186 | 9/1994 | Bergerson | 280/741 |
| 5,348,344 | 9/1994 | Blumenthal et al. | 280/737 |
| 5,350,192 | 9/1994 | Blumenthal | 280/737 |
| 5,356,176 | 10/1994 | Wells | 280/737 |
| 5,364,127 | 11/1994 | Cuevas | 280/741 |

FOREIGN PATENT DOCUMENTS

| | | |
|---|---|---|
| 0540013A1 | 5/1993 | European Pat. Off. . |
| 0604001A1 | 6/1994 | European Pat. Off. . |
| 2112006B2 | 8/1977 | Germany . |
| 4135547A1 | 4/1993 | Germany . |
| 4135776C1 | 5/1993 | Germany . |
| 2270742 | 3/1994 | United Kingdom . |

Primary Examiner—Paul N. Dickson
Attorney, Agent, or Firm—Nick C. Kottis; Gerald K. White

[57] ABSTRACT

An apparatus and method for autoignition operation of a fluid fueled inflator used in inflating a vehicle occupant restraint. The inflator device in addition to a fluid fuel, also contains stored pressurized gas.

33 Claims, 4 Drawing Sheets

AUTOIGNITION OF A FLUID FUELED INFLATOR

CROSS REFERENCE TO RELATED APPLICATIONS

This application is a continuation-in-part application of application, U.S. Ser. No. 08/339,603, filed on Nov. 15, 1994, which in turn a continuation-in-part application of application, U.S. Ser. No. 08/252,036, filed on May 31, 1994, now U.S. Pat. No. 5,470,104. Both of these applications are hereby incorporated by reference herein and are made a part hereof, including but not limited to those portions which specifically appear hereinafter.

BACKGROUND OF THE INVENTION

This invention relates generally to inflatable restraint systems and gas generators used to inflate devices such as a vehicle occupant restraint (commonly known as an air bag). More particularly, the invention relates to the autoignition of such gas generators.

It is well known to protect a vehicle occupant using a cushion or bag that is inflated/expanded with gas, e.g., an "air bag" when the vehicle encounters sudden deceleration, such as in a collision. In such systems, the cushion is normally housed in an uninflated and folded condition to minimize space requirements. Upon actuation of the inflatable restraint system, the air bag is commonly inflated in a matter of a few milliseconds with gas produced by a device commonly referred to as "a gas generator" or "an inflator."

Many types of inflator devices have been disclosed in the art for inflating an air bag for use in an inflatable restraint system. One type of inflator device involves the utilization of a quantity of stored compressed gas which is selectively released to inflate the air bag. To properly inflate a typical air bag at an appropriate rate, such a type of device commonly requires the storage of a relatively large volume of gas at relatively high pressures. As a result of the high pressures, the walls of the gas storage chamber are typically relatively thick for increased strength. The combination of large volume and thick walls results in relatively heavy and bulky inflator designs.

Another type of inflator device derives a gas source from a combustible gas generating material, e.g., a pyrotechnic, commonly ignited by means of an igniter having an ignition agent and which upon ignition generates a quantity of gas sufficient to inflate the air bag. Typically, such gas generating materials can produce various undesirable combustion products, including various solid particulate materials. The removal of such solid particulate material, such as by the incorporation of a filtering device within or about the inflator, undesirably increases inflator design and processing complexity and can increase the costs associated therewith.

In addition, the temperature of the gaseous emission of such inflator devices can typically vary between about 500° F. (260° C.) and 1200° F. (649° C.), dependent upon numerous interrelated factors including the desired level of inflator performance, as well as the type and amount of gas generant material used therein, for example. Consequently, air bags used in conjunction with such inflator devices typically are constructed of or coated with a material resistant to such high temperatures. For example, an air bag such as constructed of nylon fabric, in order to resist burn through as a result of exposure to such high temperatures, can be prepared such that the nylon fabric air bag material is coated with neoprene or one or more neoprene coated nylon patches are placed at the locations of the air bag at which the hot gas initially impinges. As will be appreciated, such specially fabricated or prepared air bags typically are more costly to manufacture and produce.

Further, while vehicular inflatable restraint systems are preferably designed to be properly operational over a broad range of conditions, the performance of such inflator device designs can be particularly sensitive to changes in the ambient conditions, especially temperature. For example, operation at very low temperatures, such as temperatures of −40° F. (−40° C.), can affect the performance of various propellants, and thus reduce the air bag pressure resulting from an inflator which contains a fixed available amount of propellant.

In a third type of inflator device, air bag inflating gas results from a combination of stored compressed gas and combustion of a gas generating material, e.g., a pyrotechnic. This type of inflator device is commonly referred to as an augmented gas or hybrid inflator. Hybrid inflators that have been proposed heretofore are subject to certain disadvantages. For example, inflator devices of such design typically result in a gas having a relatively high particulate content.

Various specific inflator devices and assemblies have been proposed in the prior art. U.S. Pat. No. 5,263,740 discloses an assembly wherein within a single chamber is housed both an inflation gas and a first ignitable material, which is subsequently ignited therein.

The housing of both an inflation gas and an ignitable material within a single chamber can result in production and storage difficulties. For example, concentration gradients of such components, both initially and over time as the device awaits actuation, can increase the potential for the release therefrom of ignitable material into the air bag prior to complete ignition, as well as increasing the relative amount of incomplete products of combustion released into the air bag.

Also, gas generators wherein, for example, a fuel and an oxidant are stored in a single chamber, can under certain extreme circumstances be subject to undesired autoignition (i.e., self-ignition) and the consequent dangers that may be associated therewith, both during manufacture and storage.

Further, as the gas mixture resulting from such a single storage chamber assembly will typically be at a relatively high temperature, such designs can be subject to the same or similar shortcomings identified above associated with high temperature emissions.

In an effort to avoid or minimize at least some of these shortcomings, it has been proposed to store the fuel and oxidant in such single chamber gas generators as a fuel lean mixture. However, operation with fuel lean mixtures can itself be subject to various operational difficulties. For example, such a single chamber gas generator operated with a fuel lean mixture can experience ignition difficulties as it can be difficult to ensure that a fuel lean mixture is completely or sufficiently uniformly combustible so as to not unduly hinder performance.

In addition, as a result of the rapid pressure and temperature rises normally associated with inflator devices which house a mixture of oxidant and ignitable material, proper and desired control and operation of such inflator devices can be difficult and/or complicated.

Inflatable restraint systems have been devised for automotive vehicles in which one or more air bags are stored in one or more storage compartments within the vehicle. In general, an air bag provided for the protection of a vehicle driver, e.g., a driver side air bag, is stored within a housing mounted in a storage compartment located in the steering column of the vehicle. Whereas, an air bag for the protection of a front seat passenger, e.g., a passenger side air bag, is typically stored within a housing mounted in the instrument panel/dash board of the vehicle.

In such systems, the gas generators or inflators must be constructed to withstand large thermal and mechanical stresses during the gas generation process. Thus, gas generators have been fabricated using steel for the casing and other structural components, with the structural components commonly joined together by screw threads, roll crimping or welding.

To satisfy light weight specifications, significant weight reduction can be achieved through the utilization of a light metal or material such as aluminum or an aluminum alloy for the generator housing and other structural components. Gas generators made of such materials typically will not experience problems in ordinary use wherein, during the event of a collision, the ignition agent is ignited, followed by the igniting of the gas generant to generate inflation gas. However, the mechanical strength of such lighter weight materials is lowered when overheated to a high temperature.

For example, a problem is encountered when generators utilizing aluminum for the housing construction are subjected to a high temperature environment, such as a bonfire. This problem stems from the fact that at a temperature in the 650° F. (343° C.) range, the pyrotechnics of the gas generator commonly automatically ignite. In this temperature range, the aluminum of the housing structure degrades and tends to rupture or burst, which in turn can result in the projection of pieces and/or fragments in various directions. This problem is not encountered with gas generators that employ steel in the housing structure since steel does not degrade until a much higher temperature of about 1100° F. (593° C.) is reached. Thus, the use of aluminum, in place of steel, in a gas generator, while serving to reduce the weight of the assembly typically results in the gas generator having a lower internal pressure capability. This lower internal pressure capability could be hazardous in a high temperature environment such as the gas generator might be subjected to in the event of a fire whether in storage, in transit, or after installation in a vehicle.

Moreover, it will be understood that regardless the material of fabrication, gas generators can be prone to rupture under certain specific conditions when subjected to sufficiently aggressive reaction of a gas generant material stored therein.

A previously disclosed solution to this problem is the incorporation of an autoignition device in the gas generator. For example, U.S. Pat. No. 4,561,675, Adams et al., assigned to the assignee of the present invention and which patent is incorporated herein in its entirety, discloses an autoignition device that causes the pyrotechnic material in a gas generator to function when the device is subjected to a predetermined high temperature below the ignition temperature of the solid fuel gas generant. The container of the autoignition device is disclosed as being hat shaped and includes a brim and a crown, with the crown attached in thermal contact with the generator housing and with the area of a wall of the container bound by the brim being closed by a foil seal.

The inclusion of an autoignition material in an inflator housing such as is used for inflators for driver side installations is also disclosed in U.S. Pat. Nos. 5,106,119 and 5,114,179 which disclose a housing apparatus wherein, by means of a piece of aluminum foil, a "packet" of autoignition material is held in place in a recess formed in the canister cover. Also, U.S. Pat. No. 5,186,491 discloses the incorporation of an autoignition material within a recess of the gas generator.

In addition, U.S. Pat. Nos. 4,998,751 and 5,109,772, both assigned to the assignee of the present invention and which patents are incorporated herein in their entirety, generally relate to inflator devices. These patents disclose the incorporation, respectively, of "an autoignition device" and "a container" which "holds or contains autoignition granules" in such gas generators within a centrally located recess. Thus, it is known to place autoignition granules within a container within such an elongated gas generator housing at one end thereof, opposite an end of a elongated igniter tube. Furthermore, it is known to use a cup-shaped container to hold such granules.

Unfortunately, the inclusion of an autoignition material in an inflator can be subject to certain drawbacks including those related to increased expense and reduced dependability. First, an autoignition material added to an inflator assembly must typically be carefully prepared, handled and installed, thereby increasing the expense associated therewith. Also, the aging characteristics of typical autoignition materials, whereby the temperature sensitivity of the material may vary over time and may result in inconsistent performance of an aged autoignition material, thereby reducing the dependability associated therewith.

SUMMARY OF THE INVENTION

A general object of the invention is to provide an improved apparatus and method for inflating an inflatable device such as an inflatable restraint for occupants of motor vehicles.

A more specific objective of the invention is to overcome one or more of the problems described above.

The general object of the invention can be attained, at least in part, through an inflatable device inflation apparatus which includes first and second chambers and initiator means for initiating the burning of at least one fluid fuel and at least one oxidant in the first chamber to produce combustion products including hot combustion gas. The first chamber includes at least one gas exit opening and has sealing means normally closing the gas exit opening. The combustion of the fluid fuel and the oxidant increases the temperature and pressure within the first chamber.

Included are opening means to open the first chamber sealing means whereby at least a portion of the hot combustion gas is expelled from the first chamber. Upon the opening of the gas exit opening sealing means, the second chamber, which chamber contains a supply of pressurized stored gas, is in fluid communication with the first chamber, with the hot combustion gas expelled from the first chamber mixing with the pressurized stored gas to produce inflation gas.

The second chamber includes at least one gas exit port and has sealing means normally closing the gas exit port. The mixing of the hot combustion gas with the pressurized stored gas increases the temperature and pressure within the second chamber.

Also included are opening means to open the second chamber sealing means whereby at least a portion of the inflation gas is expelled from the second chamber to inflate the device.

The prior art fails to provide air bag inflation gas at a sufficiently low temperature and having a sufficiently low concentration of undesirable products of combustion, e.g., incomplete products of combustion and/or particulate matter. In addition, safety and handling concerns such as those associated with the single chamber storage of an inflation gas/ignitable material mixture are not completely satisfied by prior art devices. Further, prior art devices are typically operational only with a relatively narrow variety of fuels and oxidants. In addition, such single chamber devices may produce an undesirably rapid pressure rise. Further, in order to minimize the adverse effects discussed above, proper operation of such prior art devices is typically assured over only limited relative amounts of such fuels and oxidants.

The invention further comprehends an inflatable device inflation apparatus which includes a fluid fuel storage element storing at least one fluid fuel free of oxidant, first and second chambers, and initiator means for initiating the burning of the fluid fuel and at least one oxidant in the first chamber to produce combustion products including hot combustion gas.

The first chamber includes at least one gas exit opening and has sealing means normally closing the gas exit opening. The combustion of the fluid fuel and the oxidant increases the temperature and pressure within the first chamber.

Included are opening means to open the first chamber sealing means whereby at least a portion of the hot combustion gas is expelled from the first chamber. Upon the opening of the gas exit opening sealing means, the second chamber, which chamber contains a supply of pressurized stored gas, is in fluid communication with the first chamber, with the hot combustion gas expelled from the first chamber mixing with the pressurized stored gas to produce inflation gas.

The second chamber includes at least one gas exit port and has sealing means normally closing the gas exit port. The mixing of the hot combustion gas with the pressurized stored gas increases the temperature and pressure within the second chamber.

Also included are opening means to open the second chamber sealing means whereby at least a portion of the inflation gas is expelled from the second chamber to inflate the device.

The invention still further comprehends a method for inflating an inflatable safety device in a vehicle. The method involves the step of burning at least one fluid fuel with at least one oxidant in a first sealed chamber to produce combustion products including hot combustion gas. The first sealed chamber includes at least one gas exit opening normally closed by a sealing means, and the burning increases the temperature and pressure within the chamber. The chamber sealing means are then opened to expel the hot combustion gas from the first chamber into a second chamber which includes at least one gas exit port normally closed by a sealing means and which contains a supply of pressurized stored gas. The expelled hot combustion gas are mixed with the pressurized stored gas in the second chamber to produce inflation gas. The mixing increases the temperature and pressure within the second chamber. The port sealing means are subsequently opened to expel the inflation gas from the second chamber to inflate the inflatable safety device.

Another aspect of the invention relates to autoignition in such an apparatus for inflating inflatable devices.

In one embodiment, an apparatus for inflating an inflatable device includes a fluid fuel storage element storing at least one fluid fuel free of combustion oxidant, a first and a second chamber, and initiator means for initiating the burning of the at least one fluid fuel and the at least one oxidant in normal operation.

More specifically, the first chamber is in fluid communication with the fluid fuel storage element upon opening of the fluid fuel storage element. The first chamber includes at least one gas exit opening and has sealing means normally closing the gas exit opening. In normal operation, the at least one fluid fuel and at least one stored oxidant are burned to produce combustion products including hot combustion gas, with the combustion of the at least one fluid fuel and the at least one stored oxidant increasing the temperature and pressure within the first chamber.

The apparatus also included opening means to open the first chamber sealing means whereby, in normal operation, at least a portion of the hot combustion gas is expelled from the first chamber.

The second chamber contains a supply of pressurized stored gas and is in fluid communication with the first chamber upon the opening of the gas exit opening sealing means. The second chamber includes at least one gas exit port and has sealing means normally closing the gas exit port. In normal operation, the hot combustion gas expelled from the first chamber mix with the pressurized stored gas to produce inflation gas. The mixing of the hot combustion gas with the pressurized stored gas increases the temperature and pressure within the second chamber.

The apparatus also included opening means to open the second chamber sealing means whereby, in normal operation, at least a portion of the inflation gas is expelled from the second chamber to inflate the device.

In autoignition operation of this apparatus, at a predetermined first temperature greater than the ambient temperature range to which the inflation apparatus is normally subjected, the fluid fuel storage element opens. At least a portion of the at least one fluid fuel contacts an oxidant in the first chamber with the at least one fluid fuel being characterized in igniting when exposed to the oxidant at a predetermined second temperature greater than the ambient temperature range to which the inflation apparatus is normally subjected.

Still another aspect of the invention relates to a method for autoignition operation of an apparatus for inflating an inflatable device, wherein the apparatus includes a fluid fuel storage element storing at least one fluid fuel free of combustion oxidant. The method includes the step of heating the inflation apparatus whereby at a predetermined first temperature greater than the ambient temperature range to which the inflation apparatus is normally subjected, the fluid fuel storage element opens. At least a portion of the at least one fluid fuel contacts an oxidant, with the at least one fluid fuel igniting when exposed to the oxidant at a predetermined second temperature greater than the ambient temperature range to which said inflation apparatus is normally subjected.

The prior art addition of a supplemental pyrotechnic material to affect autoignition operation adds complexity and expense to the manufacture of the inflator device and the associated manufacturing equipment.

As described herein, however, the invention can result in simplified, improved, and/or varied operation, as well as increased safety.

As used herein, references to a chamber or volume as being "free of combustion oxidant" are to be understood to refer to a chamber or volume sufficiently free of oxidant such that, over the range of pressures and temperatures experienced during the storage of the fluid fuel therein, the amount of heat liberated by chemical reaction (since the chemical reaction rate is non-zero for all temperatures) is less than the amount of heat dissipated to the surroundings. It will be appreciated that as the rate of such chemical reaction (and hence the amount of heat liberated upon reaction) is dependent on the concentration of oxidant as well as the temperature, the amount of heat liberated can be minimized through proper control of the quantity of oxidant initially present therein.

The term "equivalence ratio" (φ) is commonly used in reference to combustion processes. Equivalence ratio is defined as the ratio of the actual fuel to oxidant ratio $(F/O)_A$ divided by the stoichiometric fuel to oxidant ratio $(F/O)_S$:

$$\phi = (F/O)_A / (F/O)_S$$

(A stoichiometric reaction is a unique reaction defined as one in which all the reactants are consumed and converted to products in their most stable form. For example, in the combustion of a hydrocarbon fuel with oxygen, a stoichiometric reaction is one in which the reactants are entirely consumed and converted to products entirely constituting carbon dioxide ($CO_2$) and water vapor ($H_2O$). Conversely, a reaction involving identical reactants is not stoichiometric if any carbon monoxide (CO) is present in the products because CO may react with $O_2$ to form $CO_2$, which is considered a more stable product than CO.) In general, for given temperature and pressure conditions, fuel and oxidant mixtures are flammable over only a specific range of equivalence ratios.

The term "autoignition temperature" or "AIT" is used herein as referring to the temperature at which a given fuel and oxidant mixture will spontaneously ignite under given external conditions, including pressure. In general, the AIT is a function of the type of fuel; the size and shape of fuel-oxidant mixture combustion chamber; the oxygen concentration, pressure, and fuel/oxidant mixture stoichiometry within the chamber; and the convection of the fuel-oxidant mixture within the combustion chamber, as such factors can affect heat transfer between the fuel-oxidant mixture and the walls of the combustion chamber. It is to be understood that other, less easily characterized factors, such as the presence of a contaminant or catalyst as well as factors such as even the surface roughness of chamber walls, can impact the relevant AIT.

The phrase "rupture point temperature" or "RPT" as used herein in reference to fuel containment elements refers to the temperature at which the pressure within the element first results in structural failure thereof, to allow fuel to escape from the containment element and to contact an oxidant. The rupture point for a particular containment element is dependent on various factors, at least some of which are interrelated. Factors upon which the rupture point for a particular containment element may be dependent include:

a) the design of the containment element (e.g., shape, wall thickness, properties of the material of construction, etc.);

b) the extent to which the containment element is filled with fuel (e.g., as described herein, for fluid fuels such as liquid fuels, different liquids will exhibit different thermal expansion characteristics); and c) the chemical composition of the fluid, e.g., liquid, fuel.

Other objects and advantages will be apparent to those skilled in the art from the following detailed description taken in conjunction with the appended claims and drawings.

BRIEF DESCRIPTION OF THE DRAWINGS

Each of FIGS. 1–3 are simplified, partially in section schematic drawings of fluid fueled inflators in accordance with alternative embodiments of the invention.

DETAILED DESCRIPTION OF THE INVENTION

Figure 1:
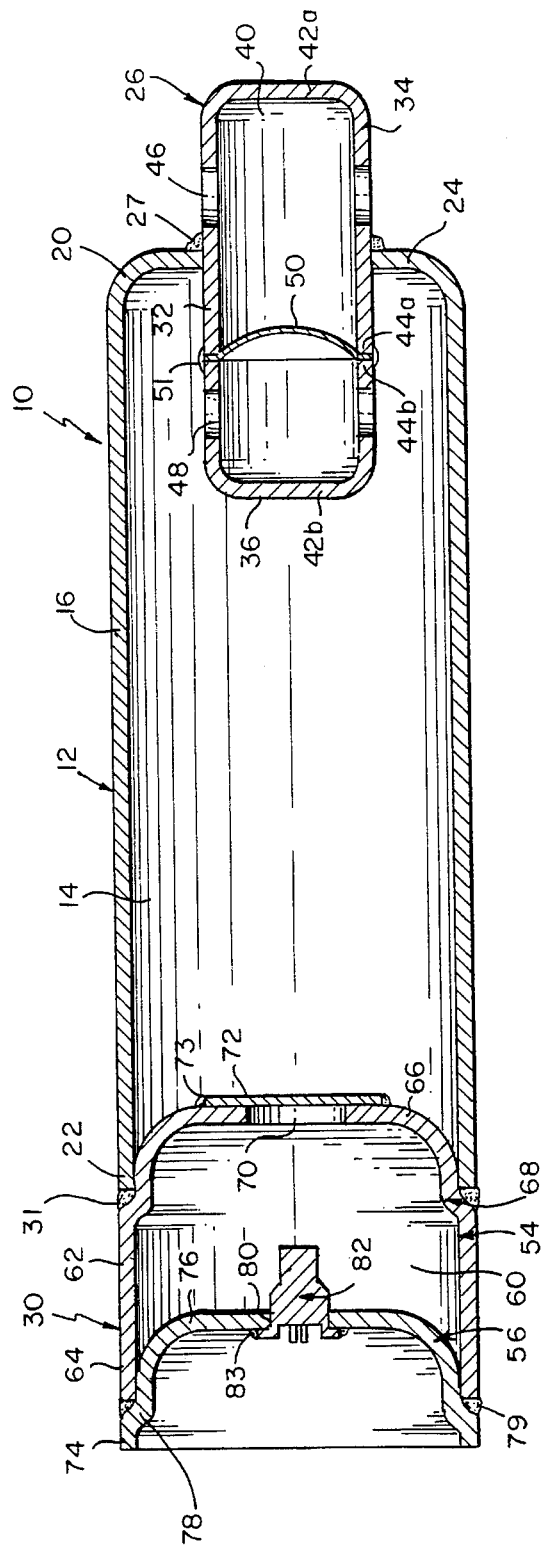

Referring initially to FIG. 1, there is illustrated a fluid fueled inflator assembly 10 for inflating a vehicle occupant restraint, such as an air bag. It will be understood that the invention described hereinafter has general applicability to various types or kinds of air bag assemblies including driver side, passenger side, and side impact air bag assemblies for automotive vehicles including vans, pick-up trucks, and particularly automobiles.

The inflator assembly 10 comprises a pressure vessel 12 including a storage chamber 14 that is filled and pressurized with an inert gas such as argon or nitrogen to a pressure typically in the range of 2000–4000 psi.

The chamber 14 is defined by an elongated generally cylindrical sleeve 16, having a first and a second end, 20 and 22, respectively. The first end 20 is partially closed by means of an integral shoulder portion 24. A diffuser assembly 26 is attached by a circumferential weld 27 in sealing relation to the sleeve first end 20. A combustion chamber assembly 30 is attached by a circumferential weld 31 in sealing relation to the sleeve second end 22.

The diffuser assembly 26 comprises a generally cylindrical sleeve 32 having a cap portion 34 and a base portion 36 to define a diffusion chamber 40. Each of the diffuser assembly cap and base portions, 34 and 36, respectively, include a closed first end 42a and 42b, respectively, and an open second end 44a and 44b, respectively. The diffuser assembly cap portion 34 includes a plurality of openings 46, adjacent the closed cap first end 42a, for dispensing inflation gas from the inflator assembly into an air bag assembly (not shown). The diffuser assembly base portion 36 additionally includes a plurality of openings 48, adjacent the closed base first end 42b, for passage of inflation gas from the storage chamber 14, into the diffuser chamber 40.

The diffuser assembly cap and base portions, 34 and 36, respectively, are aligned with the open second end of each, i.e., ends 44a and 44b, respectively, being closed by sealing means, e.g., by means of a rupture disc 50 abutting thereagainst. The diffuser assembly rupture disc 50 is joined in sealing relation with the diffuser assembly cap and base portions, 34 and 36, respectively, by means of a circumferential weld 51 at the periphery of the disc 50. In the static state, the disc 50 serves to separate the contents of the storage chamber 14 from the air bag.

The combustion chamber assembly 30 comprises a cap portion 54 and a base portion 56 to define a combustion chamber 60. Within the combustion chamber 60 is stored one or more fluid fuels and one or more oxidants, forming a flammable mixture. In practice of this aspect of the invention, the one or more fuels and one or more oxidants are together such as in intimate contact and at relatively high pressure (e.g., about 500 to 2000 psi (3.4 to 13.8 MPa), typically preferably greater than about 900 psi (6.2 MPa) and, more preferably, between about 1200 and 1800 psi (8.3 to 12.4 MPa)). As with the gas stored in the storage chamber 14, storage of gas within the combustion chamber 60 at relatively high pressures advantageously helps minimize the overall size of the inflator as well as minimize ignition delay, thereby resulting in higher and faster performance by the inflator assembly, as well as resulting in more complete combustion, such as through increased temperature and, hence, reaction rates. In addition, such an inflator assembly results in reduced or no emission of incomplete products of combustion.

The combustion chamber cap portion 54 includes a sleeve 62, constituting a side wall 64 with a dome 66 joined thereto via a cap shoulder connecting portion 68. The combustion chamber dome 66 includes an orifice, referred to herein as a gas exit opening 70. The gas exit opening 70 is normally closed by sealing means, e.g., by means of a rupture disc 72 joined in sealing relation with the combustion chamber dome 66 by means of a circumferential weld 73 at the periphery of the disc 72.

The combustion chamber dome 66 is generally designed to withstand the internal pressures generated upon the combustion of the flammable mixture within the combustion chamber 60. In the static state, the disc serves in maintaining the gas storage chamber 14 in a sealed condition.

The combustion chamber base portion 56 includes a base ring 74 with a base cap 76 joined thereto via a base shoulder connecting portion 78. The base shoulder connecting portion 78 serves as a convenient means of locating the combustion chamber base portion 56 relative to the combustion chamber sleeve 62, as well as providing a location for a circumferential weld 79 whereby the combustion chamber assembly base portion 56 is attached in sealing relation to the combustion chamber cap portion 54.

The base cap 76 includes an opening 80 therein, wherethrough an initiator device 82, such as described in greater detail below, is attached in sealing relation within the combustion chamber 60 as with a weld 83, crimping or other suitable hermetic seal.

In operation, such as upon the sensing of a collision, an electrical signal is sent to the initiator device 82. As will be described in greater detail below, the initiator device will in the appropriate selected manner initiate the combustion of the fluid fuel and oxidant mixture housed within the combustion chamber 60.

The hot gas produced upon the burning of the flammable mixture results in a rapid pressure rise within the combustion chamber 60. When the gas pressure within the combustion chamber 60 exceeds the structural capability of the rupture disc 72, the disc ruptures or otherwise permits the passage of the hot gas through the gas exit opening 70 and into the storage chamber 14. Wherein, the hot combustion gas expelled from the combustion chamber 60 mixes with the pressurized gas stored within the separate storage chamber 14 to produce inflation gas for use in inflating the inflatable restraint device, e.g., an air bag. It will be appreciated that augmenting the combustion gas with the stored inert gas produces an inflation gas having both a lower temperature and reduced byproduct concentration (e.g., CO, $NO_x$, $H_2O$, etc.) than the combustion gas alone.

When the gas pressure within the storage chamber 14 exceeds the structural capability of the rupture disc 50, the disc ruptures or otherwise permits the passage of the inflation gas through the diffuser base portion 36 and into the diffuser cap portion 34 and thus allows this inflation gas to vent through the openings 46 into the air bag assembly.

The fluid fuels useable in such an apparatus include a wide range of gases, vapors, finely divided solids and liquids such that, when used with one or more suitable oxidants in proper proportion(s) at selected conditions (either alone or in conjunction with one or more inert gases) form a flammable mixture.

Such fluid fuels include hydrogen, as well as hydrocarbon-based fuels such as hydrocarbon and hydrocarbon derivative fuels. For example, such hydrocarbon fuels include those constituting napthennic, olefinic and paraffinic hydrocarbon groups, particularly $C_1$–$C_4$ paraffinic hydrocarbon fuels. Suitable fuels that can be used in the practice of the invention include, for example; gasoline, kerosene, and octane. In addition, hydrocarbon derivative fuels such as those constituting various alcohols, ethers, and esters, for example, particularly those containing four or fewer carbon atoms and, in particular, alcohols such as ethyl and propyl alcohol can advantageously be used in the practice of the invention.

In general, the finely divided solid fuels useable in the practice of the invention must be of sufficient energy content and reactivity to heat the volume of stored gas to inflate the inflatable restraint device at the desired rate, without the inflator device being of an undesirable large size. Additionally, the fuel desirably produces no more than acceptable levels of combustion products, such as CO, NO, HCN, or $NH_3$, for example, which are or become toxic at sufficiently high concentrations.

The finely divided solid fuel useable in the practice of the invention can include one or more various powders or dusts such as those of:

a) carbonaceous materials such as coal and coal products (e.g., anthracite, bituminous, sub-bituminous, etc., such as with various volatile contents), charcoal, oil shale dust, and coke;

b) cottons, woods, and peat (such as various cellulosic materials including, for example: cellulose acetate, methylcellulose, ethylcellulose, and cellulose nitrate, as well as wood and paper dusts);

c) food feeds (such as flours, starches and grain dusts);

d) plastics, rubbers, and resins (such as epoxies, polyesters and polyethylenes); and e) metal and metal alloy materials (e.g., aluminum, magnesium, titanium, etc., as powders, grits, and/or shavings, in pure or compound form).

It is to be understood that such fuel can, if desired, be held in combinations with varying contents of liquid, vapor and combinations thereof of water.

Further, it will be appreciated that the finely divided solid fuels useable in the practice of the invention will typically include solid particles of varying size and shape. In general, however, the particle size of such finely divided solid fuel will typically vary in a range between about 5 to 500 microns and preferably in a range of about 10 to 125 microns, with mean particle sizes in the range of 10 to 40 microns. In practice, such sized finely divided solid fuels can desirably result in rapid and complete combustion, reducing or even eliminating the need for filtration of particulate from the corresponding inflator assembly design.

The use of finely divided solid fuels can result in various processing advantages. For example, such solid fuels, at least as compared relative to gaseous or liquid fuels, can simplify handling requirements and facilitate storage within an appropriate fuel storage chamber. Such facilitation in handling can, in turn, result in manufacturing cost reductions.

It will be appreciated that the fuel material, particularly fuel materials such as liquid hydrocarbons and liquid hydrocarbon derivatives (e.g., alcohols) may include therewith, in limited proportions, materials such as water that are normally not considered to be fuels. This is particularly true for those fuel materials for which complete water separation is not normally practically realizable. Additionally, the presence of water in minor amounts, e.g., less than about 10 vol %, typically between about 4–8 vol %, can beneficially reduce the possibility of undesired autoignition of the inflator assembly without significantly affecting the low temperature performance of the assembly.

It is also to be appreciated that various fuel materials can, if desired, be used mixed together. This is particularly true for those fuel materials, such as commercial grade butane, for which complete separation is not normally practically realizable. For example, fuel mixtures which have been used include: a) an alcohol mix containing about 80% ethyl alcohol, 8–10% methyl alcohol, and 4–8% water, with the balance constituting other various hydrocarbon species and b) an alkane mix containing about 90+% (e.g., about 95%) butane, 2–6% (e.g., about 4%) propane and with the balance constituting methane, ethane and other various trace hydrocarbon species. An example of such a fuel material is the denatured ethanol, "ANHYDROL SOLVENT SPECIAL, PM-4061, 190 Proof", sold by Union Carbide Chemicals and Plastics Company Inc.

Further, such fuels can be used in multi-phase combinations of two or more of the fuels in different states (e.g., gas, liquid, and solid). For example, the fluid fuel used can constitute a combination or mixture of a finely divided solid fuel in a liquid fuel, such as a starch in ethyl alcohol, for example. Similarly, the fluid fuel can constitute a combination or mixture of a gaseous fuel held in intimate contact with a liquid fuel. For example, such a gaseous fuel could be held in contact with the liquid fuel under pressure, similar in fashion to a carbonated beverage held in a container.

Oxidants useable in the invention include various oxygen-containing gases including, for example, pure oxygen, air, diluted air, and oxygen combined with one or more gas diluents such as nitrogen, carbon dioxide, and noble gases such as helium, argon, xenon. In practice, the use of pure oxygen ($O_2$) may be disadvantageous for a number of reasons including: 1) from a production viewpoint, such use may present handling difficulties, 2) such use can magnify autoignition difficulties, 3) when combined with the proper amounts of fuel (stoichiometric or near stoichiometric, $0.8 \leq \phi \leq 1.2$), extremely high flame temperatures can result (especially at the elevated pressures commonly associated with such inflator designs, and 4) at equivalence ratios of less than 0.8, excess quantities of oxygen and carbon monoxide can cause concern.

In view thereof, mixtures of argon and oxygen may be preferred. Argon advantageously is relatively: 1) inert, 2) inexpensive, 3) safe, and 4) easy to handle. The preferred relative amounts of the components of such a mixture will in general be dependent on factors such as the inflator geometry and the particular fuels used therein. For example, an oxidant mixture of 50–65 vol % oxygen with the balance being argon can advantageously be used with ethyl alcohol-based fuel-containing assemblies.

It will also be appreciated that such oxidant mixtures can be used in conjunction with minor amounts of air, such as may be initially present in the chamber to be filled with oxidant, prior to the addition of the oxidant therein.

Further, with respect to oxidants used in conjunction with a finely divided solid fuel, while the above-described oxidants are useable therewith, an enriched-oxygen mixture at elevated pressures is believed preferred.

It is to be understood that reference to a mixture as having "enriched-oxygen" is relative to a mixture having an oxygen concentration similar to that of air. Thus, mixtures containing greater than about 21% oxygen are herein considered to be "enriched-oxygen" mixtures.

In the practice of the invention, such enriched-oxygen oxidant mixtures will generally be of a pressure in the range of about 500 to about 3000 psia (about 3.45 to about 20.7 MPa), preferably in the range of about 1000 to about 2000 psia (about 6.9 to about 13.8 MPa). Further, as described above, the oxygen can be mixed with an inert gas. In addition, the use of an oxidant mixture containing about 35 to 65% oxygen, about 2 to 15% helium, and with the balance constituting one or more inert gas (such as helium, argon, and nitrogen), either alone or in various relative amounts can be advantageous. For example, an oxidant mixture of about 60% oxygen, about 32% argon and about 8% helium can result in improved hot, cold and/or ignition delay performance as well as facilitate, during the manufacturing process, the detection of leaks from the device.

Thus, the invention permits the use of a wide range of fuels in a variety of forms (including gaseous, liquid, and solid, as well as mixtures thereof, including multi-phase combinations of two or more fuel materials) and a wide variety of oxidant species, and also a wide range of relative amounts of fuel and oxidant species.

In general, the inflator assemblies of the invention are preferably operated with equivalence ratios in the range of $0.4 \leq \phi \leq 1.6$, preferably in the range of $0.6 \leq \phi \leq 1.1$.

Figure 2:
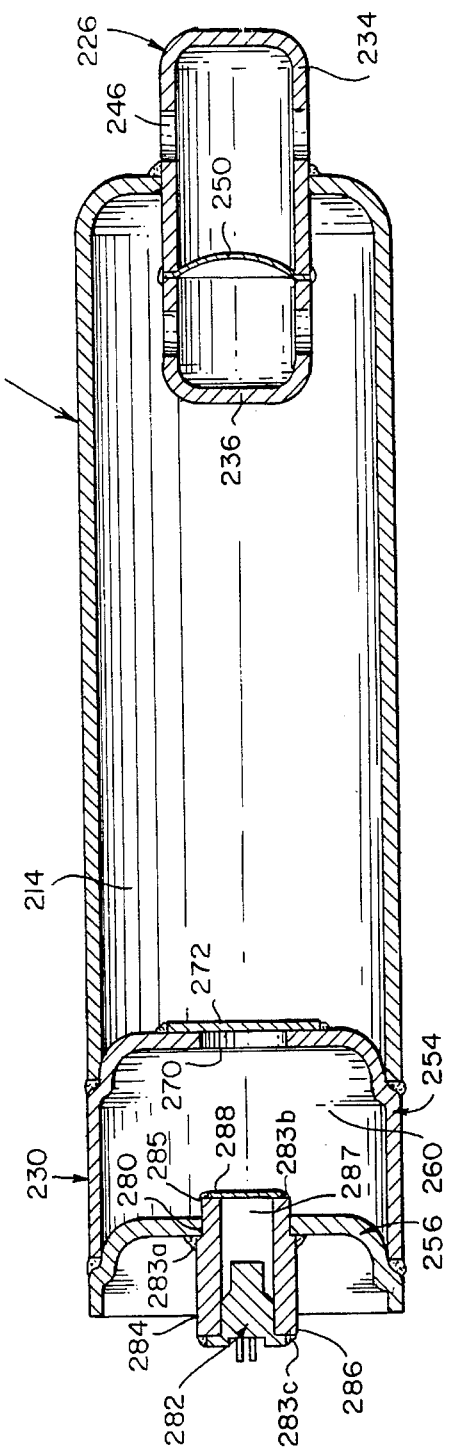
Figure 3:
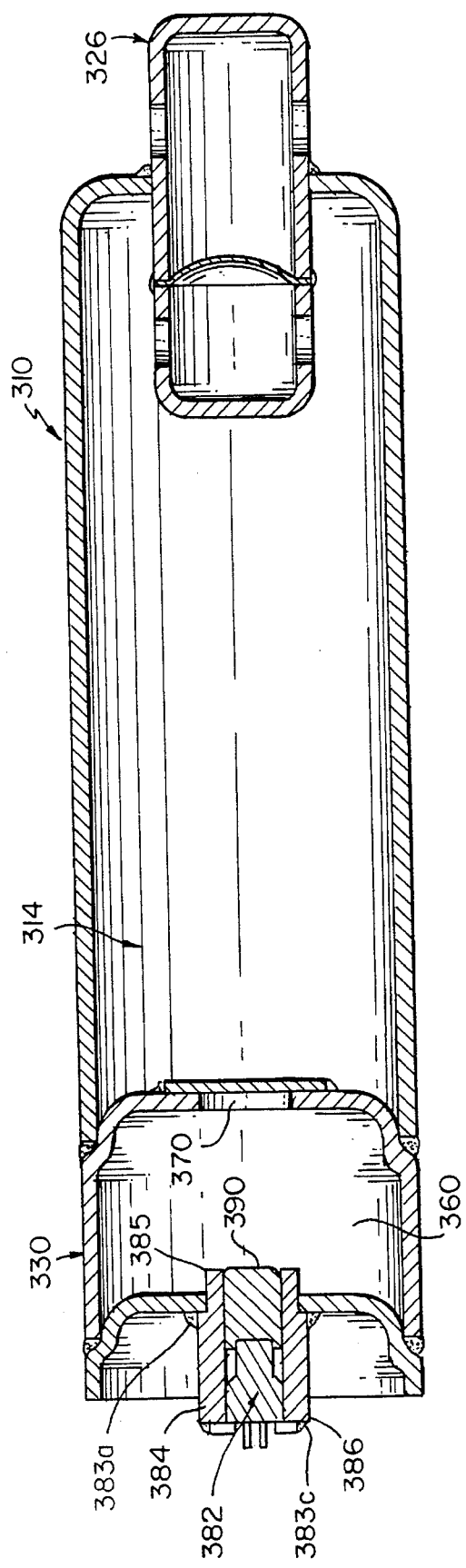

FIGS. 2 and 3 illustrate fluid fueled inflator assemblies 210 and 310, respectively, similar to the inflator assembly 10 described above and each having a storage chamber, e.g., 214 and 314, respectively, a diffuser assembly, e.g., 226 and 326, respectively, and a combustion chamber assembly, e.g., 230 and 330, respectively.

The fluid fueled inflator assemblies 210 and 310, however, differ from the inflator assembly 10 in that each of these assemblies, as described in greater detail below, include a separate fluid fuel storage element to store fluid fuel free of combustion oxidant, such as may be desired to facilitate long term storage, e.g., such as storage for 10 to 15 or more years.

Specifically, as shown in FIG. 2, the combustion chamber assembly 230 of the fluid fueled inflator assembly 210 though also including similar combustion chamber assembly cap and base portions, 254 and 256, respectively, includes an annular cylindrical wall 284, having a first and a second end, 285 and 286, respectively, and defining a fuel chamber 287. The wall 284 is attached in sealing relation within the combustion chamber 260 via a weld 283a at the base cap opening 280. The first end 285 is normally closed by means of a rupture disc 288 joined in sealing relation therewith as with a circumferential weld 283b at the periphery of the disc 288. To the second end 286 is attached, in sealing relation as with a weld 283c, an initiator device 282. Within the fuel element 287 is stored the fluid fuel, separate and apart from the oxidant which is stored within the combustion chamber.

In the operation of such an assembly, such as upon the sensing of a collision, an electrical signal is sent to the initiator device 282. In such an assembly, the initiator device will preferably of a pyrotechnic type.

As will be described in greater detail below, pyrotechnic initiator devices can: 1) advantageously provide sufficient energy output to rupture the separation means separating the fuel from the oxidant, 2) adequately disperse and vaporize the fuel in the combustion chamber, and 3) provide sufficient residual heat to ignite the resulting fuel and oxidant mixture.

Such an initiator device will, upon receipt of an appropriate electrical signal, ignite and emit a hot, particle-laden discharge into the fuel storage element 287. In turn, the temperature and pressure of the fuel stored within the fuel storage element 287 will increase.

When the structural capability of the rupture disc 288 is exceeded such as by pressure and/or heat, the disc ruptures or otherwise permits the passage of the hot fuel through the first end 285 and into the combustion chamber 260. In the combustion chamber 260, the hot fuel mixes with oxidant and ignites and burns at an elevated temperature and pressure.

When the gas pressure within the combustion chamber 260 exceeds the structural capability of the rupture disc 272, the disc ruptures or otherwise permits the passage of the hot gas through the gas exit opening 270 and into the storage chamber 214. Wherein, the hot combustion gas expelled from the combustion chamber 260 mixes with the pressurized gas stored within the storage chamber 214 to produce inflation gas for use in inflating the inflatable device, e.g., an air bag.

When the gas pressure within the storage chamber 214 exceeds the structural capability of the rupture disc 250, the disc ruptures or otherwise permits the passage of the inflation gas through the diffuser base portion 236 and into the diffuser cap portion 234 and thus allows this inflation gas to vent through the openings 246 into the air bag assembly.

FIG. 3 illustrates a fluid fueled inflator assembly wherein the fluid fuel is stored in a separate fluid fuel storage element, free of combustion oxidant, in accordance with an alterative embodiment of the invention.

The fluid fueled inflator assembly 310, shown in FIG. 3, is similar to the inflator assembly 210 described above but, rather than including a fixed wall fuel storage element sealed, for example, by means of a rupture disc, includes a rupturable flexible wall bladder 390 contained within the combustion chamber 360, in close proximity to the initiator device 382.

As shown, the bladder 390 can be fitted within an annular cylindrical wall 384, having a first and a second end, 385 and 386, respectively. Similar to the assembly 210 of FIG. 2, the wall 384 is attached in sealing relation within the combustion chamber 360 via a weld 383*a* at the base cap opening 380. Similarly, an initiator device 382 is attached, in sealing relation via a weld 383*c*, to the second end 386. The first end 385, however, can be maintained in an open state as the fuel bladder 390 is fitted within the annular opening of the wall 384, adjacent the discharge end of the initiator device 382.

The bladder 390 preferably is formed of a material sufficiently impervious to the fluid fuel stored therein to prevent undesired mixing of the fuel with the oxidant stored in the adjacent or surrounding combustion chamber 360. In such an assembly and by way of the described use of a fuel bladder, fluid fuel is stored free of combustion oxidant.

In the operation of such an assembly, such as upon the sensing of a collision, an electrical signal is sent to the initiator device 382. In such an assembly, the initiator device will also preferably be of a pyrotechnic type. Again in such an assembly, pyrotechnic initiator devices can: 1) advantageously provide sufficient energy, e.g., heat, output to rupture the flexible wall bladder, 2) adequately disperse the fuel in the combustion chamber, and 3) provide sufficient residual heat to ignite the resulting fuel and oxidant mixture.

Such an initiator device will, upon receipt of an appropriate electrical signal, ignite and emit a hot, particle-laden discharge at the surface of the adjacent fuel bladder, resulting in the piercing or otherwise opening of the bladder 390 and the consequent mixing of fuel therefrom with oxidant stored in the combustion chamber 360. That is, the fuel is dispersed into the oxidant and vaporized as a result of the energy output of the initiator device. In turn, residual heat and hot radiant particles issuing forth from the initiator device provide an effective ignition source. The mix of fuel and oxidant then ignites and burns.

As with the above-described embodiments, the hot gas produced upon the burning of the flammable mixture results in a rapid pressure rise within the combustion chamber 360, with the subsequent passage of hot gas through the gas exit opening 370 and into the storage chamber 314. Wherein, the hot combustion gas expelled from the combustion chamber 360 mixes with the pressurized gas stored within the storage chamber 314 to produce inflation gas for use in inflating the inflatable device, e.g., an air bag, in a manner similar to that described above relative to the embodiments illustrated in FIGS. 1 and 2.

It will be appreciated that by appropriately filling the bladder with fuel prior to placement of the bladder within the combustion chamber, e.g., prior to addition of oxidant in the combustion chamber, and subsequently filling the combustion chamber with oxidant at the selected pressure, the filling process is rendered relatively safe and easy.

It is also to be understood that similar fuel-containing bladder inflator assembly designs can be utilized in applications wherein only short term separation of fuel and oxidant is required or desired. For example, such a fuel-containing flexible wall bladder can be used to keep fuel and oxidant separate during the loading and/or sealing (e.g., welding) operations associated with the fabrication of such inflator assemblies, e.g., the loading and sealing of the oxidant chamber which houses the fuel-containing bladder. After such loading and/or sealing it may no longer be necessary or desirable to maintain such separation between the fuel and oxidant. It will be appreciated that in general the structural integrity of the bladder material need not be as great where only a relatively short term separation of fuel and oxidant is required or desired, e.g., the material forming the bladder need only be sufficiently impervious to the fuel to prevent such undesired mixing for a relatively short period of time.

In general, the fluid fuels useable in such assemblies wherein fluid fuel is stored in a storage element free of combustion oxidant can be the same as those described above and including, as described below, various gaseous, liquified gases, liquid fuels, finely divided solids and multi-phase combinations of two or more thereof.

As described above, in order to reduce the overall size of the inflator assembly and to satisfy performance criteria, oxidants are stored at relatively high pressures. In turn, relative to the use of gaseous fuels, it may be preferred that the gaseous fuel be stored at pressures in the same general range, e.g., nearly equal, as the pressure at which the oxidant is stored. It will be appreciated that as the inflator assembly designs of the invention generally rely on the initiator supplying sufficient energy to effect breaking, burning through, or rupturing of the separation barrier between the fuel and the oxidant, e.g., a rupture disc or fuel bladder wall, storage of gaseous fuels and oxidants at near equal pressures avoids the need for a separation barrier of greater thickness or strength, as would typically be required if the barrier would be required to withstand a large pressure differential for a prolonged period of time. As most potential gaseous fuels normally liquify at such relatively high pressures, preferred gaseous fuels for use in assemblies of the invention wherein fluid fuel is stored in a storage element free of combustion oxidant include hydrogen and methane.

With respect to liquified gas fuels, a factor in the selection of an appropriate fuel material is the liquid-phase expansion characteristics of the material. In general, the fuel material will be selected and the fuel storage element filled sufficiently, such that for designed increases in ambient temperature, such as for abnormal storage at temperatures as high as about 230° F. (110° C.), the fuel storage element will not reach a state where the storage element is completely filled with liquid. With such a storage element nearly completely filled with liquid, upon the subsequent additional heat and mass input such as from an initiator, the liquid within the storage element will have little or no volume available for expansion. Thus, with such additional heat and mass input, the pressure within the storage element will increase and desirably result in the breaking or rupturing of the separation element. In practice, the separation element for use in this aspect of the invention need be sufficiently strong and durable to withstand fatigue such as caused by the expansion and compression of the material stored within the storage element normally associated with and resulting from changes in ambient conditions.

It is to be understood that the designed increase in ambient temperature (e.g., the maximum design ambient temperature can be higher or lower) as well as the strength of the corresponding separation element can be appropriately altered to satisfy the needs for particular applications. For example, in at least some inflator assembly designs it may be desirable that the fuel storage element be filled sufficiently with fuel such that the fuel storage element will reach the state where the storage element is completely filled with liquid at a lower maximum design ambient temperature, e.g., a temperature less than about 230° F. (110° C.).

Liquified gases for use in the practice of the invention can include ethane, propane, butane and various mixtures of these and other appropriate gases.

With respect to the use of liquid fuels in such designs wherein the fuel is stored separately from the oxidant, liquid fuels such as those identified above with respect to assemblies wherein fuel and oxidant are stored in a mixed or non-separated condition including ethyl alcohol, can be used.

One important aspect of the invention relates to autoignition operation of such inflator apparatus which utilize a fluid fuel, e.g., a liquid fuel, stored separately from the oxidant. Such autoignition operation will be described in detail below relative to the fluid fueled inflator assembly 210, shown in FIG. 2 and described above. It is to be understood, however, that such autoignition operation can be appropriately utilized, in accordance with the inventions with other embodiments of inflator apparatus utilizing a fluid fuel, e.g., a liquid fuel, stored separately from the oxidant.

In a first embodiment of autoignition operation of the fluid fueled inflator assembly 210, the fuel storage element 287 is sufficiently filled with a fluid fuel, particularly a liquid fuel, such that upon being heated to the rupture point temperature, the fuel storage element 287 experiences failure, e.g., the structural capability of the rupture disc 288 is exceeded such that the disc 288 ruptures or otherwise permits the passage of the hot fuel through the first end 285 and into the combustion chamber 260.

In practice, the fuel used in such practice preferably can be in the nature of the above-described hydrocarbon-based fuels such as hydrocarbon and hydrocarbon derivative fuels, such as those constituting various alcohols, ethers, esters, and low molecular weight alkanes and which fuel materials are liquid under the storage conditions (e.g., pressure and temperature). For example, such fuels may particularly include one or more fuels containing four or fewer carbon atoms and, in particular, alcohols such as ethyl and propyl alcohol and/or one or more $C_2$–$C_4$ alkanes, e.g., ethane, propane, and butane.

Upon passage of the hot fuel into the combustion chamber 260, the hot fuel mixes with stored oxidant and autoignites immediately in the oxidizing environment and burns.

In turn, when the gas pressure within the combustion chamber 260 exceeds the structural capability of the rupture disc 272, the disc ruptures or otherwise permits the passage of the hot gas through the gas exit opening 270 and into the storage chamber 214. Wherein, the hot combustion gas expelled from the combustion chamber 260 mixes with the pressurized gas stored within the storage chamber 214 to produce inflation gas for use in inflating the inflatable device, e.g., an air bag.

When the gas pressure within the storage chamber 214 exceeds the structural capability of the rupture disc 250, the disc ruptures or otherwise permits the passage of the inflation gas through the diffuser base portion 236 and into the diffuser cap portion 234 and thus allows this inflation gas to vent through the openings 246 into the air bag assembly.

The fuel selected for use in the inflator assembly desirably provides the assembly with adequate and/or desired performance in terms of design parameters such as gas pressure, toxicity, aging characteristics, etc., over the appropriate designed operating regime for the assembly.

With respect to autoignition operation in accordance with the invention, it is to be appreciated that parameters such as the liquid phase expansion and fuel autoignition temperature can be appropriately chosen and/or varied to achieve the desired result. For example, it will be appreciated that the fuel utilized in the practice of the invention can constitute a mixture of two or more fuel materials, such as those identified above. Further, such a fuel mixture need not be totally miscible and, as will be detailed below, the components of such fuel mixtures can be used to affect the thermal expansion properties and/or autoignition temperature of the fuel.

In a second embodiment of autoignition operation of the fluid fueled inflator assembly 210, in accordance with the invention, the fuel storage element 287 is sufficiently filled with a fluid fuel, particularly a liquid fuel, such as described above with reference to the first embodiment of the autoignition operation, such that upon being heated to the rupture point temperature, the fuel storage element 287 experiences failure as in the first autoignition embodiment described above. However, rather than the fuel autoigniting immediately in the oxidizing environment, additional heat input is required to effect autoignition of the fuel-oxidant mixture. That is, the fuel AIT is greater than the RPT of the fuel containment element. Moreover, it is to be appreciated that the fuel or fuel mixture can be selected to provide or result in the desired fuel AIT to permit operation in accordance with the detailed operating regime.

As in the prior embodiment, failure of the fuel storage element 287 can, for example, be in the nature of the structural capability of the rupture disc 288 being exceeded such that the disc 288 ruptures or otherwise permits the passage of the hot fuel through the first end 285 and into the combustion chamber 260.

Upon the described additional heat input, the fuel-oxidant mixture will autoignite and operation will then be similar to that described above relative to the first autoignition embodiment, e.g., such combustion results in the gas pressure within the combustion chamber 260 increasing and when the pressure exceeds the structural capability of the rupture disc 272, the disc ruptures or otherwise permits the passage of the hot gas through the gas exit opening 270 and into the storage chamber 214. Wherein, the hot combustion gas expelled from the combustion chamber 260 mixes with the pressurized gas stored within the storage chamber 214 to produce inflation gas for use in inflating the inflatable device, e.g., an air bag. When the gas pressure within the storage chamber 214 exceeds the structural capability of the rupture disc 250, the disc 250 ruptures or otherwise permits the passage of the inflation gas through the diffuser base portion 236 and into the diffuser cap portion 234 and thus allows this inflation gas to vent through the openings 246 into the air bag assembly.

Such a mode of operation can advantageously be employed in conjunction with an inflator assembly fabricated of a relatively robust material, e.g., steel, and employing a high pressure rupture disc, as the operation of such a fabricated assembly would preferably not be undesirably effected at the relatively high pressures associated with rupture of such a containment element.

In a third embodiment of autoignition operation of the fluid fueled inflator assembly 210, in accordance with the invention, the assembly 210 is designed such that when the assembly is first heated to a temperature below the rupture point temperature, the gas pressure within the storage chamber 214 exceeds the structural capability of the rupture disc 250, such that the disc 250 ruptures or otherwise permits the inert gas stored within the storage chamber 214 to vent through the openings 246 into the air bag assembly.

Also, when the pressure within the combustion chamber 260 exceeds the structural capability of the rupture disc 272, the disc 272 ruptures or otherwise permits the passage of the stored oxidant through the gas exit opening 270 and into the storage chamber 214, which has, as described above, been already opened to the environment.

Finally, when the temperature has reached the RPT of the fuel chamber 287, the structural capability of the rupture disc 288 is exceeded such that the disc 288 ruptures or otherwise permits the passage of the hot fuel, particularly a liquid fuel, such as described above with reference to the first embodiment of the autoignition operation, through the first end 285 and into the combustion chamber 260. In the combustion chamber 260, the hot fuel mixes with oxidant, such as oxygen in air that has entered into the assembly 210 through the ruptured discs 250 and 272, respectively, and burns relatively harmlessly in the resulting low pressure, open-to-air environment.

A significant benefit which may be realized with operation in accordance with this third embodiment is increased safety as may result from the autoignition reaction occurring at the relatively low pressure conditions, normally associated with such a mode of operation.

It is to be appreciated, that in such an embodiment, in addition to design factors normally associated with the fuel containment device including, for example, the fuel composition, fill fraction, and container size, shape and strength, key design parameters can include:

1) the gas storage pressure of the storage chamber 214, 2) the rupture strength (e.g., the pressure at which rupture occurs) of the disc 250, 3) the gas storage pressure of the combustion chamber 260, 4) the rupture strength (e.g., the pressure at which rupture occurs) of the disc 272.

It is to be appreciated that the specific operation of an assembly in accordance with the invention will typically depend, at least in part, on the relationship between the fuel AIT and the RPT of the fuel containment element.

For example, if the fuel AIT is less than the RPT of the fuel containment element, then in operation the hot fuel (which has been stored in an essentially oxygen-free environment within the fuel containment element) will immediately ignite when the RPT has been reached, resulting in rupture thereof and contact of the fuel with sufficient oxygen to effect ignition.

In one embodiment of the invention, the fuel AIT is at least as great as the RPT of the fuel containment element.

Specifically, if the fuel AIT and the RPT of the fuel containment element are substantially equal, then rupture of the containment element and ignition of the fuel will typically occur almost simultaneously, e.g., in practice, ignition of the fuel would only lag the rupture of the containment element by only some short reaction time delay.

When, however, the fuel AIT is greater than the RPT of the fuel containment element, after rupture of the containment element additional heat input, such as from a bonfire, will typically be required to effect ignition of the fuel.

The above-described autoignition operational embodiments of the fluid fueled inflator assembly avoid the use of an autoignition pyrotechnic yet still ensure autoignition operation at a prescribed temperature. Thus, both simplifying and reducing the cost of the inflator assembly.

Thus, the invention provides a reliable apparatus and method of producing an autoignition phenomena at a specified temperature without the need to include any supplemental material to the squib, as has been commonly done in the prior art via the inclusion of an autoignition pyrotechnic.

In addition, it is to be appreciated that the autoignition operation of the inflator apparatus of the invention can be additionally enhanced by the inclusion, typically in small amounts or concentrations, of one or more autoignition enhancing materials, such as can be added to the primary fuel or fuel mixture stored therein. For example, if a fluid fueled inflator assembly is utilized for which the primary fuel or fuel mix would itself not be capable of autoignition at the specific conditions, e.g., the temperature, pressure, and oxygen concentration within the combustion chamber such as upon rupture of the fuel storage element and at which conditions autoignition operation of the assembly is desired, one or more autoignition enhancing materials can be added to the fuel or fuel mixture stored therein. In this way, the autoignition temperature of a fuel mixture can be adjusted to temperatures below that necessary to autoignite a particular fuel, when used alone.

In practice, selection of an appropriate autoignition enhancing material or materials will depend, at least in part, on the particular fuel-oxidant mixture to be used in the assembly. Specifically, in the practice of the invention wherein it may be generally desirable to lower or reduce the AIT of the fuel and oxidant-containing mixture within the combustion chamber, autoignition enhancing materials which serve to so lower or reduce the AIT of the mixture will preferably be selected. Appropriate autoignition enhancing materials for use in particular embodiments of the invention may include, but are not limited to: paraffinic fuels such as n-octane, n-heptane and n-hexane; mixtures of petroleum distillates such as conventional hydrocarbon-containing fuel blends (e.g., diesel fuel, JP-4, gasoline, etc.) and mineral oils, as well as various ethers and esters, for example.

The present invention is described in further detail in connection with the following examples which illustrate/ simulate various aspects involved in the practice of the invention. It is to be understood that all changes that come within the spirit of the invention are desired to be protected and thus the invention is not to be construed as limited by these examples.

EXAMPLES

Liquids, such as the common liquid fuels as may be employed in the practice of the invention, typically undergo some degree of expansion when subjected to increasing temperatures. This effect is particularly pronounced for low critical point fuels. The lower molecular weight alkane family (e.g., ethane, propane, and butane) are examples of such fuels suited for use in the above-described fluid fueled inflators.

The expansion properties of these fuels can be used to result in rupture of their containment element (assumed for purposes of these examples to be a rigid container having a constant volume) within the fluid fueled inflator. More specifically, the rupture point of a containment element is typically a factor of the specific design of the containment element, e.g., the wall thickness and strength, and the thermodynamic properties, e.g., pressure, volume and temperature relationship, of the material, e.g., fuel, stored therein.

Figure 4:
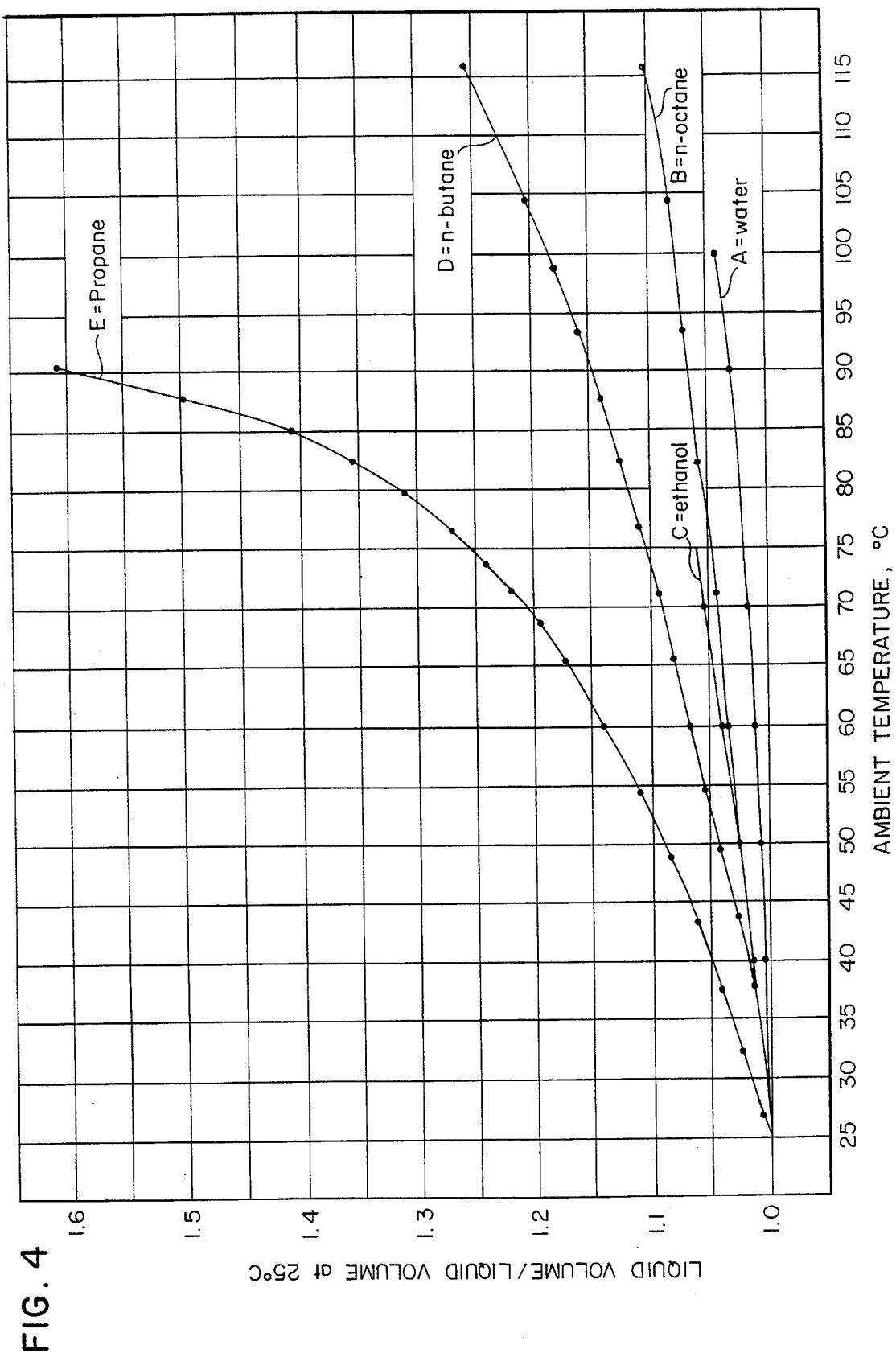
FIG. 4 shows the liquid volume/liquid volume at 25° C. versus ambient temperature for selected liquid materials.

FIG. 4 shows the liquid volume/liquid volume at 25° C. versus ambient temperature for selected materials:

A=water, B=n-octane, C=ethanol, D=n-butane, and E=n-propane.

Figure 5:
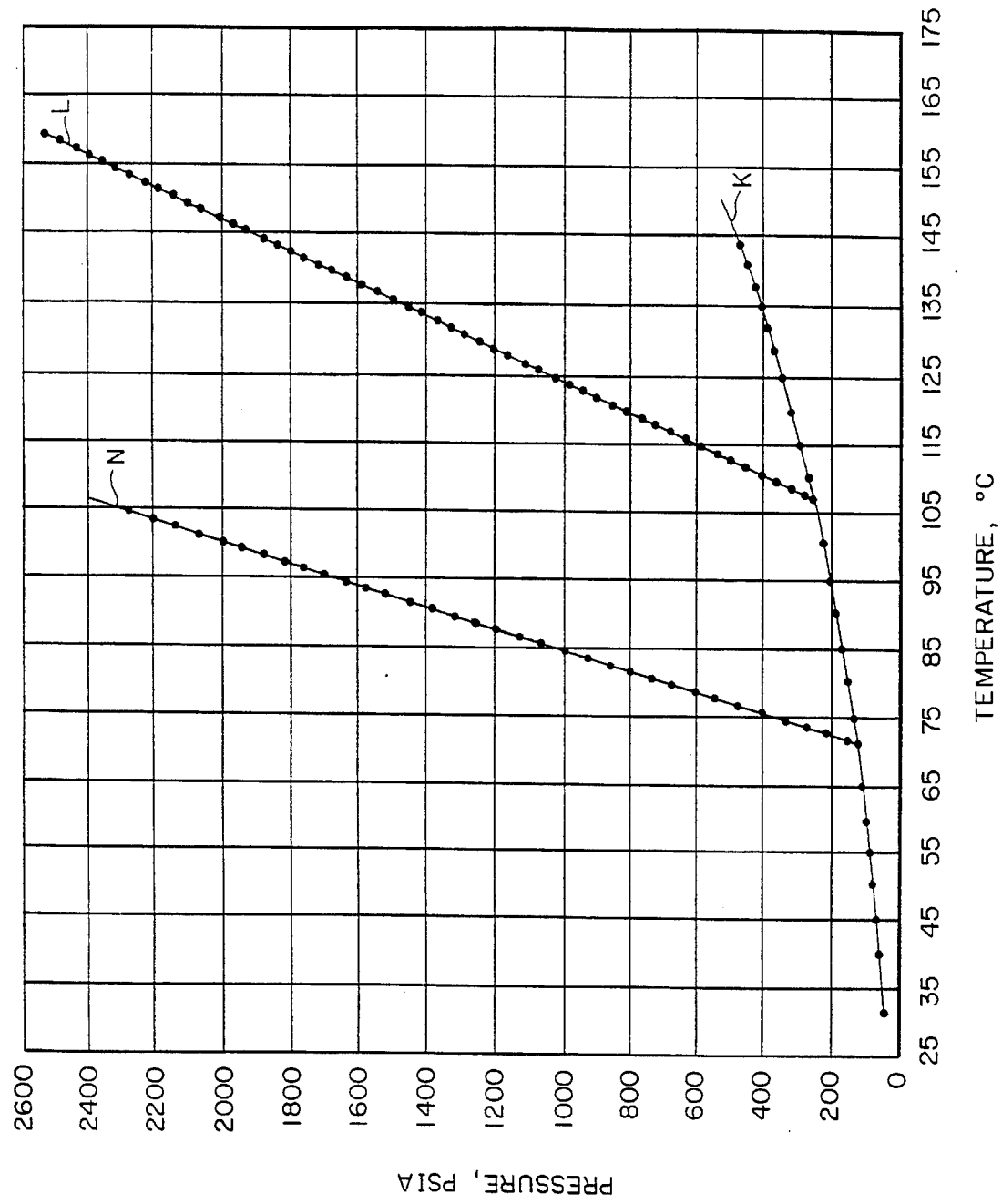
FIG. 5 shows the vapor pressure curve for n-butane and the internal pressure for a rigid container when completely filled with liquid n-butane versus ambient temperature as calculated for Examples 1 and 2.

FIG. 5 shows the vapor pressure curve for n-butane, i.e., line K, and the internal pressure for a rigid container when completely filled with liquid n-butane versus ambient temperature as calculated for Examples 1 and 2 (both hypothetical).

It is to be generally understood that the internal pressure for a vessel (containing only n-butane, in both a liquid and vapor form) is given by the vapor pressure curve for n-butane. In practice, such a curve would be adjusted to account for the presence of any other species such as air, water, or other hydrocarbon constituent, for example.

EXAMPLE 1

A fuel storage element is initially 82.6 vol % filled with pure liquid n-butane at 25° C., with the remaining volume occupied by n-butane vapor. Thus, no air is present in the element.

As the so filled fuel storage element is heated, the liquid n-butane expands and its vapor pressure increases, generally in accordance with the curve shown in FIG. 5. Given the initial temperature and liquid fill fraction, this storage element would be entirely filled with liquid when the ambient temperature (and, hence, the temperature within the fuel storage element) has been increased to about 107° C. Thus, over an expected fuel storage element ambient temperature range of about −40° C. to about 107° C., the internal pressure within the storage element would not exceed the vapor pressure of the fluid fuel.

However, for any further temperature increase to the contents of the element, the liquid n-butane would have no further available volume within the element in which to expand. As a result, for such further temperature increase, the pressure rise within the storage element would generally follow the 100% full of liquid at 107° C. line (i.e., line L), shown in FIG. 5.

EXAMPLE 2

A fuel storage element, as in EXAMPLE 1, in this hypothetical example is initially 91.6 vol % filled with pure liquid n-butane at 25° C., with the remaining volume occupied by n-butane vapor. As a result, the element would be 100% full of liquid at a temperature of about 71° C. Given further increases in temperature, the resulting pressure rise in this element would follow the 100% full of liquid at 71° C. line (i.e., line N), shown in FIG. 5.

Similar curves can, if desired, be drawn for other selected fuels and mixtures thereof, in particular for other liquid fuels of choice, and desired initial fill fractions of these fuels and fuel mixtures.

Thus, as evident from these examples, through the proper design and filling of the fuel containment element, a fluid fueled inflator in accordance with the invention can be made such that the fuel containment element will rupture and expose the fuel to oxidant and autoignite at a prescribed temperature.

EXAMPLE 3

In this example, an inflator assembly similar in construction to that of FIG. 2, fabricated of steel and utilizing a pyrotechnic initiator was subjected to a bonfire. Specifically, the storage chamber (chamber 214) was filled with 174 grams of pure argon gas as approximately 4200 psia. The combustion chamber (chamber 260) was filled with 16.9 grams of a mixture of 65 vol % oxygen and 35 vol % argon at a pressure of 1900 psia. The fuel utilized was denatured ethanol, "ANHYDROL SOLVENT SPECIAL, PM-4083, 200 Proof," sold by Union Carbide Chemicals and Plastics Company Inc. The fuel was stored within a fuel storage element (element 287) which was welded to the inflator directly in line with the discharge of the pyrotechnic initiator. The fuel storage element contained 3.37 grams (roughly 4.3 cc) of the denatured ethanol at 21° C. and was 92% filled with liquid at those conditions.

Upon placement directly into a bonfire, the inflator assembly heated for 1.5 minutes at which time the diffuser assembly rupture disc (rupture disc 250) failed, thereby allowing the inert argon gas to be released from the assembly and into the surrounding environment.

After the passage of a total of 2.5 minutes from the initial placement of the assembly into the bonfire, the element (element 272) separating the combustion chamber (chamber 260) from the storage chamber (chamber 214) failed, thereby allowing the high pressure stored oxidant to be relatively harmlessly released from the inflator assembly.

The fuel storage element (element 287) failed 24 seconds later, i.e., 2 minutes and 54 seconds into the event. Since at this time the combustion chamber contained only low pressure atmospheric air, the relatively small fuel load released into the combustion chamber and quickly and harmlessly burned.

Finally, 5 minutes and 44 seconds into the event and after full combustion of the stored fuel, the pyrotechnic initiator of the assembly ignited due to the intense heat of the bonfire.

Thus, the inflator assembly in this example functioned as described above relative to the third autoignition operation embodiment of the invention.

The invention illustratively disclosed herein suitably may be practiced in the absence of any element, part, step, component, or ingredient which is not specifically disclosed herein.

The foregoing detailed description is given for clearness of understanding only, and no unnecessary limitations are to be understood therefrom, as modifications within the scope of the invention will be obvious to those skilled in the art.

What is claimed is:

1. An apparatus for inflating an inflatable device, said apparatus comprising:

a fluid fuel storage element storing at least one fuel in the form of a fluid and free of combustion oxidant, a first chamber in fluid communication with said fluid fuel storage element upon opening of said fluid fuel storage element, said first chamber including at least one gas exit opening and having sealing means normally closing said gas exit opening, and wherein, in normal operation, the at least one fuel and at least one stored oxidant are burned to produce combustion products including hot combustion gas, with the combustion of the at least one fuel and the at least one stored oxidant increasing the temperature and pressure within said first chamber, said first chamber sealing means adapted to open when a predetermined increase in pressure within said first chamber is realized, whereby, in normal operation, at least a portion of said hot combustion gas is expelled from said first chamber, a second chamber containing a supply of pressurized stored gas, said second chamber in fluid communication with said first chamber upon the opening of said first chamber sealing means, with said second chamber including at least one gas exit port and having sealing means normally closing said gas exit port, in normal operation said hot combustion gas expelled from said first chamber mixing with said pressurized stored gas to produce inflation gas, the mixing of said hot combustion gas with said pressurized stored gas increasing the temperature and pressure within said second chamber, said second chamber sealing means adapted to open when a predetermined increase in pressure within said second chamber is realized after said hot combustion gas expelled from said first chamber mixes with said pressurized stored gas to produce said inflation gas, whereby, in normal operation, at least a portion of said inflation gas is expelled from said second chamber to inflate said device, and initiator means for initiating the burning of the at least one fuel and the at least one oxidant in normal operation, wherein under autoignition operation, at a predetermined first temperature greater than the ambient temperature range to which said inflation apparatus is normally subjected, said fluid fuel storage element opens and at least a portion of the at least one fuel contacts an oxidant in said first chamber, with the at least one fuel being characterized in igniting when exposed to the oxidant at a predetermined second temperature, greater than the ambient temperature range to which said inflation apparatus is normally subjected.

2. The apparatus of claim 1 wherein the fuel in the form of a fluid includes a liquid form.

3. The apparatus of claim 1 wherein the fuel in the form of a fluid comprises a multi-phase combination of liquid and finely divided solid.

4. The apparatus of claim 1 wherein the fuel in the form of a fluid is a hydrocarbon-based fuel.

5. The apparatus of claim 1 wherein the fuel in the form of a fluid includes ethyl alcohol.

6. The apparatus of claim 1 wherein the fuel in the form of a fluid includes propyl alcohol.

7. The apparatus of claim 1 wherein the fuel in the form of a fluid includes at least one $C_2$-$C_4$ alkane.

8. The apparatus of claim 1 wherein, under autoignition operation, the oxidant with which the at least one fuel is burned comprises the at least one stored oxidant.

9. The apparatus of claim 1 where in, under autoignition operation, the oxidant with which the at least one fuel is burned comprises air.

10. The apparatus of claim 1 wherein said fluid fuel storage element stores a mixture comprising a primary fuel and an autoignition enhancing material.

11. The apparatus of claim 10 wherein the autoignition enhancing material is a paraffinic fuel selected from the group consisting of n-octane, n-heptane and n-hexane.

12. The apparatus of claim 10 wherein the autoignition enhancing material is a petroleum distillates selected from the group consisting of diesel fuel, JP-4, and gasoline.

13. The apparatus of claim 10 wherein the autoignition enhancing material is a mineral oil.

14. The apparatus of claim 1 wherein the predetermined second temperature is at least as great as the predetermined first temperature.

15. The apparatus of claim 1 wherein the predetermined first temperature and the predetermined second temperature are substantially the same.

16. The apparatus of claim 1 wherein the predetermined first temperature is greater than the predetermined second temperature.

17. The apparatus of claim 1 wherein the predetermined first temperature is less than the predetermined second temperature.

18. An apparatus for inflating an inflatable device, said apparatus comprising:

a liquid fuel storage element storing at least one liquid fuel free of combustion oxidant, a first chamber in fluid communication with said liquid fuel storage element upon opening of said liquid fuel storage element, said first chamber including at least one gas exit opening and having sealing means normally closing said gas exit opening, and wherein, in normal operation, the at least one liquid fuel and at least one stored oxidant are burned to produce combustion products including hot combustion gas, with the combustion of the at least one liquid fuel and the at least one stored oxidant increasing the temperature and pressure within said first chamber, said first chamber sealing means adapted to open when a predetermined increase in pressure within said first chamber is realized, whereby, in normal operation, at least a portion of said hot combustion gas is expelled from said first chamber, a second chamber containing a supply of pressurized stored gas, said second chamber in fluid communication with said first chamber upon the opening of said first chamber sealing means, with said second chamber including at least one gas exit port and having sealing means normally closing said gas exit port, in normal operation said hot combustion gas expelled from said first chamber mixing with said pressurized stored gas to produce inflation gas, the mixing of said hot combustion gas with said pressurized stored gas increasing the temperature and pressure within said second chamber, said second chamber sealing means adapted to open when a predetermined increase in pressure within said second chamber is realized after said hot combustion gas expelled from said first chamber mixes with said pressurized stored gas to produce said inflation gas, whereby, in normal operation, at least a portion of said inflation gas is expelled from said second chamber to inflate said device, and initiator means for initiating the burning of the at least one liquid fuel and the at least one oxidant in normal operation, wherein under autoignition operation, at a predetermined first temperature greater than the ambient temperature range to which said inflation apparatus is normally subjected, said liquid fuel storage element opens and at least a portion of the at least one liquid fuel contacts an oxidant in said first chamber, with the at least one liquid fuel being characterized in igniting when exposed to the oxidant at a predetermined second temperature at least as great as the predetermined first temperature.

19. The apparatus of claim 18 wherein, under autoignition operation, the oxidant with which the at least one fluid fuel is burned comprises the at least one stored oxidant.

20. The apparatus of claim 18 wherein, under autoignition operation, the oxidant with which the at least one fluid fuel is burned comprises air.

21. The apparatus of claim 18 wherein said fluid fuel storage element stores a mixture comprising a primary fuel and an autoignition enhancing material.

22. A method for autoignition operation of an apparatus for inflating an inflatable device, wherein the apparatus includes a fluid fuel storage element storing at least one fuel in the form of a fluid and free of combustion oxidant, with the apparatus also including a closed combustion chamber in fluid communication with the fluid fuel storage element upon opening of the fluid fuel storage element, said method comprising the step of:

heating the inflation apparatus whereby at a predetermined first temperature greater than the ambient temperature range to which the inflation apparatus is normally subjected, the fluid fuel storage element opens and at least a portion of the fuel contacts an oxidant in the closed combustion chamber, with the fuel igniting when exposed to the oxidant at a predetermined second temperature, greater than the ambient temperature range to which the inflation apparatus is normally subjected to produce combustion products, with the closed combustion chamber opening when a predetermined increase in pressure within the first chamber is realized.

23. The method of claim 22 wherein the predetermined second temperature is at least as great as the predetermined first temperature.

24. The method of claim 32 wherein the predetermined first temperature and the predetermined second temperature are substantially the same.

25. The method of claim 32 wherein the predetermined first temperature is greater than the predetermined second temperature.

26. The method of claim 22 wherein the predetermined first temperature is less than the predetermined second temperature.

27. A method of autoignition operation of an apparatus for inflating an inflatable device, wherein the apparatus includes a fluid fuel storage element storing at least one fuel in the form of a fluid and free of combustion oxidant, said method comprising the steps of:

heating the inflation apparatus whereby at a predetermined first temperature greater than the ambient temperature range to which the inflation apparatus is normally subjected, the fluid fuel storage element opens and at least a portion of the at least one fuel contacts an oxidant, with the at least one fuel igniting when exposed to the oxidant at a predetermined second temperature, greater than the ambient temperature range to which said inflation apparatus is normally subjected, burning the at least one fuel with the oxidant in a first sealed chamber to produce combustion products including hot combustion gas, wherein the first sealed chamber includes at least one gas exit opening normally closed by a sealing means, said burning increasing the temperature and pressure within the first chamber, opening the first chamber sealing means to expel the hot combustion gas from the first chamber into a second chamber containing a supply of pressurized stored gas, mixing the expelled hot combustion gas with the pressurized stored gas in the second chamber to produce inflation gas, wherein the second chamber includes at least one gas exit port normally closed by a sealing means, said mixing increasing the temperature and pressure within the second chamber, and opening the second chamber port sealing means to expel the inflation gas from the second chamber to inflate the inflatable safety device.

28. A method of autoignition operation of an apparatus for inflating an inflatable device, wherein the apparatus includes a fluid fuel storage element storing at least one fuel in the form of fluid and free of combustion oxidant, said method comprising the step of:

heating the inflation apparatus whereby at a predetermined first temperature greater than the ambient temperature range to which the inflation apparatus is normally subjected, the fluid fuel storage element opens and at least a portion of the at least one fuel contacts an oxidant, with the at least one fuel igniting when exposed to the oxidant at a predetermined second temperature, greater than the ambient temperature range to which the inflation apparatus is normally subjected, wherein the inflation apparatus also includes:

a first chamber containing a supply of stored oxidant, the first chamber in fluid communication with the fluid fuel storage element upon opening of the fluid fuel storage element, the first chamber including at least one gas exit opening and having sealing means normally closing the gas exit opening, and a second chamber containing a supply of pressurized stored gas, the second chamber in fluid communication with the first chamber upon the opening of the gas exit opening sealing means, with the second chamber including at least one gas exit port and having sealing means normally closing the gas exit port, wherein said method, prior to the igniting of the at least one fuel, additionally comprises the steps of:

opening the second chamber sealing means to vent at least a portion of the pressurized stored gas, followed by, opening the first chamber sealing means to vent at least a portion of the stored oxidant to vent through the open second chamber.

29. A method for autoignition operation of an apparatus for inflating an inflatable device, wherein the apparatus includes a fluid fuel storage element storing at least one fluid fuel in the form of a fluid and free of combustion oxidant, with the apparatus also including a closed combustion chamber in fluid communication with the fluid fuel storage element upon opening of the fluid fuel storage element, said method comprising the steps of:

opening the closed combustion chamber, followed by opening the fluid fuel storage element when the inflation apparatus is heated to a predetermined first temperature greater than the ambient temperature range to which the inflation apparatus is normally subjected whereby at least a portion of the fuel contacts an oxidant in the combustion chamber, with the fuel igniting when exposed to the oxidant at a predetermined second temperature, greater than the ambient temperature range to which the inflation apparatus is normally subjected.

30. The method of claim 29 wherein the predetermined second temperature is at least as great as the predetermined first temperature.

31. The method of claim 29 wherein the predetermined first temperature and the predetermined second temperature are substantially the same.

32. The method of claim 29 wherein the predetermined first temperature is greater than the predetermined second temperature.

33. The method of claim 29 wherein the predetermined first temperature is less than the predetermined second temperature.

* * * * *